United States Patent Office 3,294,701
Patented Dec. 27, 1966

3,294,701
METHOD OF PREPARING FLUORESCENT RARE EARTH COMPOUNDS
Marcel J. Vogel and John W. Brookman, San Jose, Calif., assignors to International Business Machines Corporation, New York, N.Y., a corporation of New York
No Drawing. Filed Nov. 16, 1961, Ser. No. 152,932
9 Claims. (Cl. 252—301.6)

Our invention relates to energy conversion systems and to fluorescent substances. More particularly, our invention relates to systems wherein electromagnetic radiation is converted to radiation of longer wave lengths.

Known energy conversion systems utilize a source of short wave light and a phosphor. A receptor for the longer wave length output of the phosphor may also be utilized. These systems are useless for high temperature operation, because the usual phosphor does not fluoresce at temperatures above about 300–400° C. Furthermore, phosphors generally have a broad emission band which reduces the light output at a given frequency because the total light output is spread over many other frequencies.

We have now discovered that many rare earth compounds are excellent energy converters at both cryogenic temperatures and temperatures near the melting point of the substances. Moreover, the light emitted by many of these substances is essentially coherent at both low and high temperatures.

Any source of ultraviolet light wherein the light output is more than about 2500 A. can be utilized in our energy conversion systems. A 250 w. G.E. U-Varc lamp is sufficient to cause a brilliant fluorescence in our fluorescent compounds. The fluorescent substances utilized in our invention do not visibly fluoresce to any great extent in sunlight or in other weak ultraviolet light radiation, though they do emit strongly as can be ascertained with a pupillary spectroscope or the like.

Generally speaking, the fluorescent substances of our invention have the structural formula:

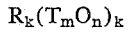

$$R_k(T_mO_n)_k$$

where R is a rare earth element, T is a transition metal element, excluding the rare earth elements or an element selected from the group consisting of beryllium, zinc, cadium, boron, aluminum, indium, thallium, germanium, silicon, arsenic, antimony, bismuth, and polonium, O is oxygen, $k$ is a number between 1 and 3, $m$ is a number between 1 and 5, and $n$ is a number between 3 and 12, the combination of $k$, $m$ and $n$ being such that the valence requirements of the compound are satisfied.

Preferably, R is selected from the group of rare earth oxides consisting of cerium, neodymium, samarium, europium, gadolinium, terbium, and dysprosium. Transition metals and other elements which can be used in forming the fluorescent substances of our invention are, preferably, beryllium, zinc, cadmium, boron, aluminum, yttrium, indium, thallium, germanium, hafnium, arsenic, niobium, antimony, bismuth, polonium, ruthenium, osmium, rhodium, iridium, nickel, palladium, and platinum.

Generally, these compositions are formed by heating a mixture of a rare earth oxide and an oxide of a transition metal or one of the above recited nontransition elements to the fusion point of the mass, cycling the temperature of the mixture about the fusion point of the mass, and cooling to form crystals which, except for the metals of period 4 of groups VI$_b$–VIII$_b$ of the periodic classification of the elements, are essentially water white. Fluorescent compositions containing transition metal elements of the 4th period of groups VI$_b$–VIII$_b$ of the periodic classification of the elements are colored at room temperature. These compounds include chromium, manganese, iron, cobalt and nickel.

The chemicals utilized in forming these fluorescent substances should be essentially pure to form narrow band width energy converters. We prefer to utilize electronic grade chemicals for this purpose.

Where the fluorescent substances of our invention are substantially white, including water white, they show cation fluorescence. The colored compounds show only anion fluorescence.

Utectic forming fluxes may be utilized where the flux forming elements boil from the mixture prior to cooling the prepared compositions. Where a flux is utilized, heating should be rapid so as to minimize the evaporation of the flux during the heating cycle. Examples of suitable fluxes include lithium and ammonium halides and the halides of transition metals. The transition metal halide selected should be the same metal as that contained in the anion material of the phosphors. Mixtures containing materials of very high melting points, such as mixtures of a rare earth oxide with aluminum oxide or silicon dioxide, can be readily fused by this device at temperatures on the order of 1100° C. to 1200° C.

From about 2 to about 20% by weight of utectic forming material is added to the raw material mixture. Preferably, from about 2 to about 10% of the utectic forming materials is utilized. Preferred utectic forming materials are ammonium fluoride, lithium bromide and the fluorides of the particular transition metal being utilized to prepare a fluorescent material.

Molar ratios of about 10:1 to about 1:10 rare earth oxides to transition metal and nontransition elements beryllium, zinc, cadmium, boron, aluminum, indium, thallium, germanium, silicon, arsenic, antimony, bismuth, and polonium or nontransition compound compounds are used to make our fluorescent compounds, though ratios of about 3:1 to about 1:3 are satisfactory when making phosphors having as cations, cerium, neodymium, dysprosium, gadolinium, samarium, terbium, and europium radicals. Greater ratios are required with praseodymium, erbium, thulium, lutetium, and holmium radicals.

The oxides of rare earths which are to form the cationic portion of the molecule and the transition metal compound or nontransition metal compound which is to form the anionic portion of the molecule are heated in a nonreducing atmosphere to the fusion point and cycled above and below this temperature. Thermal cycling apparently allows the growth of a crystal structure necessary for fluorescence. Generally, the forming fluorescent composition is cycled from about 10 to about 100° C. above its fusion point to about 10 to about 100° C. below its fusion point for at least 5 minutes. We prefer to cycle the material from about 20° C. above to about 20° C. below the fusion point of the forming fluorescent material for at least about 30 minutes. The fusion temperature includes the softening which normally accompanies sintering, as well as complete melting.

After thermal cycling of the phosphor is complete, the phosphor is cooled to room temperature. Different compounds require different cooling rates. If a compound is white at its melting point, it can usually be removed from the furnace and allowed to cool in the absence of additional heating. The aluminates, germanates, silicates, tantalates and borates are of this class.

Other compositions, such as the tungstates, remain highly colored after extensive thermal cycling. These compositions must be cooled slowly, especially where large single crystals are being formed, to bleach color from the material. We believe that the slow cooling or annealing removes color from the crystal by reducing structural stresses and filling in oxygen vacancies.

Annealing is readily accomplished by reducing the median thermal cycle temperature in 100° increments at hourly intervals as the crystals go through a regular color sequence, from intense dark colors approaching black, to white. Thus, where the compounds do not change color appreciably at a particular stage in the cooling cycle, the cycling period is extended a short while before the temperature is reduced. Where rapid bleaching takes place, the cycling period can be shortened and the temperature reductions increased.

Any of the known receptors for a particular light output can be utilized in our invention with, of course, an appropriate fluorescent compound.

Any of the presently known radiation detectors can be utilized to receive the long wave output of the fluorescent substances of our invention. The differing fluorescence of the various compounds can be used to advantage in our energy conversion systems where it is desired to code articles for identification, price, etc.

Thus, crystals of europium tungstate and terbium tungstate which emit in the red and green, respectively, can be used as pigments in inks. The inks can be printed on packages to form binary numbers which identify the packages. A device utilizing, as inputs, cadmium selenide and cadmium sulfide photocells which have peak reception at about 6500–7000 A. and 5100 A., respectively, can be used as an input for a digital computer system which would record the passage of a marked package past a reading station. Such a device could be used to continuously and automatically maintain inventory and billing records.

These systems can also be utilized in optical satellite tracking operations. The sunlight, outside the earth's atmosphere, would cause a satellite to glow vividly at a particular wave length. Photocells receptive to this wave length can be utilized as an input for a tracking device.

The following examples more fully illustrate various aspects of our invention. However, it is not intended that our invention be limited to the exact short wave radiation sources, fluorescent substances, narrow band receivers, or processes for preparing the fluorescent phosphors of our invention shown. Rather, it is intended that all equivalents obvious to those skilled in the art be included within the scope of our invention as claimed.

*Example I*

To prepare a fluorescent europium tungstate, 3.52 grams of 99.9+% pure europium oxide from Research Chemicals, Inc., and 7.496 grams of tungstic acid (reagent grade), a 1:3 ratio, were mixed in a glass mortar and pestle and further mixed in a Perken-Elmer Micromuller to obtain a uniform mixture. The mixture, in a closed Morganite (recrystallized aluminum oxide) crucible, was fired in a Pacific Scientific Company heat treating furnace, Type EU–AL–2350 for one hour at 1000° C. The temperature in the furnace was controlled by a Minneapolis-Honeywell Pryrovane controller which cycled the temperature within the furnace between about 970° and 1015° C. during the heating period. The fused material was cooled to room temperature, reheated to 1000° C. and slowly cooled to room temperature over a 63-hour period. The resulting $Eu_2(WO_4)_3$ is a highly crystalline white powder with a density of 7.44 g./cm.$^3$. The melting point of the fired material is 1130° C. as determined from a temperature-time cooling plot. The crystalline material was found to have a peak emission at 6160 A. The band spread had a 50% point of 50 A. and a peak of 4 A. There was no loss in band width up to 700° C. At helium temperature (about 4° K.) there was a slight reduction in emission band spread and an appearance of fine structure on the spectra as seen by a Cary Model 114 Spectrophotometer, utilizing the fluorescence attachment employing a Hanovia quartz burner at a 2 A. gap width.

*Example II*

Single crystals of europium tungstate suitable for X-ray diffraction studies were prepared in a 2-inch platinum boat by placing a 10 gram aliquot of a 3:1 europium oxide to tungstic acid mixture around the bottom of the boat, placing the boat in the furnace at 1130° C. and over a 5.5 hour period heating the furnace to 1175° C. After heating, the melt was reduced to room temperature. This cycle was repeated with 10 grams aliquots until 70 grams of mix had been added. The crystals which had formed in the central portion of the boat were removed, leaving a depression within the mass of crystals into which broken crystals protruded. The removed mixture was ground and placed in the central depression. The boat was replaced in the furnace and cycled between 1140° and 1200° C. until the ground mass in the bottom of the boat migrated to the fused crystal bases, thereby forming crystals across the depression.

The heated material was cooled from 1175° to 800° C. over a 3-hour period, heated at 800° C. for 15 hours and cooled to room temperature by dropping the temperature of the furnace in 100° increments per hour.

The transparent crystals were up to about 1.5 x 0.25 inches in size, and had the properties of the phosphor of Example I. During the cooling, the crystals changed from brownish-black in appearance to an amber color, and then to essentially water white. The crystals are very slightly pink in sunlight. The following table characterizes the properties of these single crystals:

EUROPIUM TUNGSTATE

| | |
|---|---|
| Crystal system | Monoclinic. |
| Unit cell dimensions [1] | $a=7.72, b=11.50, c=11.42, A+1\%, \beta=109.7°$. |
| Probable space group | $C_2^6h.-C2/c$. |
| Density | 7.44 g./cc. (exp.), 7.29 (calc.). |
| Formula weights/unit cell | 4. |
| Melting point | 1130±15° C. |
| Fluorescence decay (1/e) | $150 \times 10^{-6}$ sec. |
| Magnetic susceptibility | $8.36 \times 10^{-6}$ emu./g. (294° K.). |
| Effective number of Bohr magnetons | 3.28 (experimental). |
| Effective number of Bohr magnetons $Eu^{3+}$ | 3.4 (theoretical). |
| Refractive index approx. | 2.1. |
| Dielectric constant (1 kc.) | 4.1. |

[1] The lattice can also be described by a face-centered cell with $a=7.72, b=11.50, c=21.51, \beta=90°$, which is more convenient for indexing of the powder pattern. The symmetry is not orthorhombic, however.

*Example III*

A mixture of cerium oxide and tungstic acid, in a 2:1 ratio, was placed in a Morganite crystal and thermally cycled about a median temperature of 975° C. for five minutes. The fused melt was cooled to 800° C. and held at this temperature for 16 hours during which time the furnace was allowed to cycle over a 20° temperature spread. The melt was then cooled to room temperature over an additional 16-hour period. As the material was annealed, it changed from a light yellow appearance to a tan appearance, and then to a final very light tan. When viewed under a long wave ultraviolet lamp, the cerium tungstate material emits a brilliant orange-yellow fluorescence having a green peak at 5750 A. and a yellow band at about 6200 A.

*Example IV*

Utilizing the process of Example I, dysprosium oxide and tungstic acid, in a 1:3 molar ratio mixture, was cycled at 1000° C. for 1 hour and at 1100° C. for 15 hours, after which the mixture melt was cooled at room temperature over a 24-hour period. The polycrystalline material was a light tan in appearance and emitted a sharp yellow light similar to that emitted by the cerium compound.

Example V

A fluorescent terbium tungstate material was formed by heating a 1:3 molar ratio mixture of terbium oxide and tungstic acid for 1 hour at 1000° C. and 15 hours at 1100° C. The melt was cooled to room temperature over a 24-hour period and yielded a white polycrystalline material which had a narrow band bright green emission of 4 lines at about 5450 A.

Example VI

Following the procedure of Example V, gadolinium oxide and tungstic acid, in a 1:3 molar ratio mixture, were fused to form a white polycrystalline powder. The gadolinium tungstate material had a bright yellow fluorescence.

Example VII

Utilizing the procedure of Example V, samarium tungstate was formed from a 1:3 molar ratio mixture of samarium oxide and tungstic acid to form a white polycrystalline powder which emitted a brilliant yellow having three spectral lines.

Example VIII

A 1:3 molar ratio mixture of aluminum oxide and europium oxide were heated, in the presence of 10% aluminum fluoride, for one hour at 1350° C. After the cycling period, the material was cooled at room temperature to form a white polycrystalline material which emitted an orange-red color characteristic of europium.

Example IX

A fluorescent europium germanate was formed by cycling a 3:1 molar ratio mixture of germanium oxide and europium oxide for 30 minutes at 1300° C. After the cycling period, the mix was cooled to form a white polycrystalline material which gave the characteristic orange-red of europium.

Example X

A 1:1 molar ratio mixture of silicon dioxide and europium oxide, containing 10% by weight lithium bromide, was cycled for 1 hour at 1100° C. and cooled at room temperature. The silicate material is transparent and has a yellowish cast. The emission is the characteristic orange-red. When viewed spectroscopically, a sharp green line appears which is not visible to the naked eye. The line is very sharp and is thought to be a forbidden line.

Example XI

A 3:1 molar ratio mixture of tantalum pentoxide and europium oxide, containing 10% by weight lithium bromide, was thermally cycled for one-half hour at a median temperature of 1250° C. and cooled at room temperature. The slightly tan polycrystalline material emitted the characteristic orange light.

Example XII

A 1:1 molar ratio mixture of $B_2O_3$ and europium oxide were thermally cycled for one-half hour at a median temperature of 640° C. and cooled at room temperature. The resulting white polycrystalline particles emitted had a predominant emission band at 6100 A. A second band at 5950 A. was practically extinct.

Example XIII

A europium tungstate layer was created on quartz glass by spraying a 5% by weight solution of sodium tungstate in water on a quartz glass substrate in a furnace heated to 1100° C. The glass sample was cooled at room temperature and reheated to 1100° C., sprayed with 10% by weight $EuCl_2$ and water. On cooling, a crystalline layer of fluoresced europium tungstate was sintered to the glass.

Example XIV

A 1:1 molar ratio mixture of lanthanum oxide and tungstic acid were mixed with 10% by weight lithium bromide and thermally cycled for 15 minutes at a median temperature of 925° C. The resulting fluorescent compound emits a beautiful bluish-white light.

Example XV

A 1:1:1 molar ratio mixture of lanthanum oxide to praseodymium oxide to tungstic acid was heated with 10% by weight lithium bromide for 16 hours at a median temperature of 925° C. The polycrystalline essentially white powder emitted an orange fluorescent characteristic of praseodymium.

Example XVI

A 1:3 molar ratio mixture of europium and molybdic oxides was thermally cycled for 1 hour at 800° C., cooled to 700° C., and cycled at this temperature for 64 hours, and then cooled slowly to room temperature to yield a clear crystalline mass showing an orange-red fluorescence under ultraviolet excitation.

Example XVII

A 1:1 molar ratio mixture of europium oxide and vanadium pentoxide was heated for five minutes at 610° C. and one hour at 600° C. prior to being cooled to room temperature. The material is dark brown and fluoresces a deep blue at room temperature. On heating above 300° C., the characteristic cationic fluorescence of europium is noted.

Now, having described our invention, we claim:

1. The process of forming fluorescent compounds comprising mixing a rare earth oxide and an oxide selected from the group consisting of transition metal oxides exclusive of the rare earth oxides, beryllium oxide, zinc oxide, cadmium oxide, boron oxide, aluminum oxide, indium oxide, thallium oxide, germanium oxide, arsenic oxide, antimony oxide, bismuth oxide, and polonium oxide in a molar ratio mixture of about 10:1 to 1:10, heating the mixture to its fusion point, cycling the temperature above and below the fusion point, and cooling the resulting compound to form fluorescent crystals.

2. The process of claim 1 wherein the rare earth is selected from the group consisting of cerium, samarium, europium, neodymium, gadolinium, terbium, and dysprosium.

3. The process of claim 1 wherein the transition metal is selected from the group consisting of yttrium, hafnium, niobium, ruthenium, osmium, rhodium, iridium, nickel, palladium, platinum, chromium, vanadium, molybdenum, tungsten and tatalum.

4. The process of claim 1 wherein the molar ratio mixture is from about 3:1 to 1:3.

5. The process of claim 1 wherein from about 2 to about 20% by weight of a flux forming material is included in the mixture prior to heating the mixture to the fusion point.

6. The process of claim 5 wherein from about 2 to about 10% by weight of a flux forming material is utilized.

7. The process of claim 5 wherein the flux forming material is selected from the group consisting of lithium halides, ammonium halides, and transition metal halides.

8. The process of claim 5 wherein the flux forming material is selected from the group consisting of ammonium fluoride, lithium bromide, and the transition metal fluorides.

9. In the process of forming a compound having the formula:

$$R_k(T_mO_n)_k$$

where R is a rare earth element, T is an element selected from the group consisting of transition metal elements exclusive of the rare earth elements, beryllium, zinc, cadmium, boron, aluminum, indium, thallium, germanium, arsenic, antimony, bismuth, and polonium, O is oxygen, $k$ is a number between 1 and 3, $m$ is a number between 1 and 5, and $n$ is a number between 3 and 12, the combination of $k$, $m$ and $n$ being such that the valence requirements of the compound are satisfied, the steps comprising heating the compound to its fusion point, cycling the temperature above and below the fusion point, and cooling the resulting compound to form fluorescent crystals.

References Cited by the Examiner

UNITED STATES PATENTS

| | | | |
|---|---|---|---|
| 2,042,425 | 5/1936 | Kaufmann et al. | 252—301.4 |
| 2,393,469 | 1/1946 | Hooley | 252—301.4 |
| 2,467,689 | 4/1949 | Overbeek | 252—301.4 |
| 2,470,173 | 5/1949 | Leverenz | 252—301.4 |
| 2,473,703 | 6/1949 | Colton | 23—51 |
| 2,812,234 | 11/1957 | Robinson | 23—51 |
| 3,027,329 | 3/1962 | Grimmeiss | 252—301.4 |

OTHER REFERENCES

Chemical Abstracts: vol. 47, p. 6,809$i$, 1953; vol. 50, p. 2,350$c$, 1956; vol. 54, p. 18,058$c$, 1960.

Kroger: "Some Aspects of the Luminescence of Solids," Elsevier Pub. Co., New York, 1948, pp. 107–149, 274, 286, 291 and 292.

Partington: "A Textbook of Inorganic Chemistry," MacMillan and Co., London, 1950, p. 819.

Sneed et al.: "Comprehensive Inorganic Chemistry," vol. 4, D. Van Nostrand Co. Inc., New York, 1955, pp. 141, 147, 149, 154, and 182.

TOBIAS E. LEVOW, *Primary Examiner.*

JULIUS GREENWALD, MAURICE A. BRINDISI,
*Examiners.*

R. D. EDMONDS, *Assistant Examiner.*